(12) United States Patent
Whitcomb et al.

(10) Patent No.: US 8,573,452 B2
(45) Date of Patent: Nov. 5, 2013

(54) TRIGGER ACTIVATED VENTED VALVE SYSTEM

(75) Inventors: Shane C. Whitcomb, Loveland, CO (US); Christopher S. Wilson, Loveland, CO (US)

(73) Assignee: Stroker Industries, LLC, Loveland, CO (US)

( * ) Notice: Subject to any disclaimer, the term of this patent is extended or adjusted under 35 U.S.C. 154(b) by 550 days.

(21) Appl. No.: 12/380,211

(22) Filed: Feb. 25, 2009

(65) Prior Publication Data

US 2009/0218533 A1   Sep. 3, 2009

Related U.S. Application Data

(60) Provisional application No. 61/067,450, filed on Feb. 28, 2008.

(51) Int. Cl.
| | |
|---|---|
| *A47G 19/00* | (2006.01) |
| *A47G 19/12* | (2006.01) |
| *B65D 83/00* | (2006.01) |
| *B67D 3/00* | (2006.01) |
| *B65D 47/00* | (2006.01) |
| *B65D 5/72* | (2006.01) |
| *B65D 25/40* | (2006.01) |
| *B65D 35/38* | (2006.01) |

(52) U.S. Cl.
 USPC ........... 222/484; 222/470; 222/545; 222/559; 222/568

(58) Field of Classification Search
 USPC .............. 137/625.49, 595, 625.18, 625.2, 137/625.27, 625.28, 625.33, 625.37, 625.5, 137/625.67; 222/400.7, 182, 482, 92, 222/94–96, 105, 106, 130, 166, 386.5, 470, 222/481, 481.5, 483, 484, 487, 545, 568, 222/559; 251/322, 323
 See application file for complete search history.

(56) References Cited

U.S. PATENT DOCUMENTS

| | | | | |
|---|---|---|---|---|
| 1,878,019 | A | * | 9/1932 | Stickney .................. 137/625.33 |
| 3,235,133 | A | * | 2/1966 | Zimmerman et al. ........ 222/478 |
| 4,809,884 | A | * | 3/1989 | Stackhouse .............. 222/153.04 |
| 4,832,237 | A | * | 5/1989 | Hurford, Jr. ................ 222/464.1 |
| 5,193,748 | A | * | 3/1993 | Wittersheim et al. ......... 239/337 |
| 5,667,110 | A | * | 9/1997 | McCann et al. ........... 222/386.5 |
| 7,040,515 | B2 | * | 5/2006 | Cote .......................... 222/481.5 |
| 7,416,087 | B2 | * | 8/2008 | Press ....................... 222/189.06 |

* cited by examiner

*Primary Examiner* — John Rivell
*Assistant Examiner* — Hailey K Do
(74) *Attorney, Agent, or Firm* — Craig R. Miles; CR Miles P.C.

(57) ABSTRACT

A valve having a valve trigger which operates to provide coincident fluidic coupling of a fluid delivery passage and fluid compensation passage to a fluid source.

20 Claims, 5 Drawing Sheets

US 8,573,452 B2

TRIGGER ACTIVATED VENTED VALVE SYSTEM

This United States Non-provisional Patent Application claims the benefit of U.S. Provisional Patent Application No. 61/067,450, filed Feb. 28, 2008, hereby incorporated by reference herein.

I. BACKGROUND

A valve having a valve trigger which operates to provide coincident fluidic coupling of a fluid delivery passage and fluid compensation passage to a fluid source.

Conventional valves typically operate between an open condition and a closed condition to regulate the flow of a fluid (whether a gas or a liquid) in a conduit. The fluid can be delivered from a fluid source. When the fluid source is configured to contain the fluid in an enclosed space without a vent to atmosphere, delivery of the fluid from the enclosed space can reduce pressure in the enclosed space of the fluid source to create a partial vacuum which can make delivery of the fluid from the fluid source increasingly difficult with increase in reduction of pressure.

The conventional solution to the problem is to provide a fluid source vent discrete from outlet of the fluid source. As fluid is delivered from the fluid source, an amount of fluid (typically atmosphere) enters the fluid source through the discrete fluid source vent to establish pressure within the fluid source at about atmospheric pressure obviating a reduction in pressure or creation of a partial vacuum in the fluid source. One non-limiting example is a conventional gas container which has a spout through which gas is delivered from the gas container. A discrete vent coupled to the gas container allows atmosphere to enter the gas container to avoid a partial vacuum or a reduction in pressure which obviates or reduces pulsation in the delivery of an amount of gas from the gas container.

The problems with a discrete vent are well known. First, the vent provides a second perforation of the container from which fluid can flow when the container is inverted whether to deliver the remaining amount of fluid in the container or inadvertently inverted or tipped over. Second, the vent often allows escape of gases from the fluid source even when the vent is considered shut. Third the vent is an additional part of the container which can become clogged, defective, malfunction, or become broken.

The inventive valve and method of using the inventive valve provides a solution to obviate the reduction of pressure or the creation of a partial vacuum as fluid is delivered from the enclosed space of a fluid source.

II. SUMMARY OF THE INVENTION

Accordingly, a broad object of the invention can be to provide a valve which allows coincident fluidic coupling of a fluid delivery passage and fluid compensation passage to a fluid source which allows delivery of a fluid from the fluid source while providing a compensating flow of a fluid into the enclosed space of the fluid source.

Another broad object of the invention can be provide a single valve trigger which operates to establish coincident fluidic coupling of a fluid delivery passage and fluid compensation passage to a fluid source and can further operate to establish coincident fluidic uncoupling of the fluid delivery passage and the fluid compensation passage from the fluid source.

Another broad object of the invention can be to provide a valve housing configured to provide a valve trigger guide in which the valve trigger travels and to provide each of a discrete fluid delivery passage and the fluid compensation passage.

Another broad object of the invention can be to provide a method of using a valve to provide coincident fluidic coupling of a fluid delivery passage and fluid compensation passage to a fluid source.

Naturally, further objects of the invention are disclosed throughout other areas of the specification, drawings, photographs, and claims.

III. A BRIEF DESCRIPTION OF THE DRAWINGS

IV. DETAILED DESCRIPTION OF THE PREFERRED EMBODIMENTS

A valve which operates to provide coincident fluidic coupling of a fluid delivery passage and fluid compensation passage to a fluid source.

Figure 1:
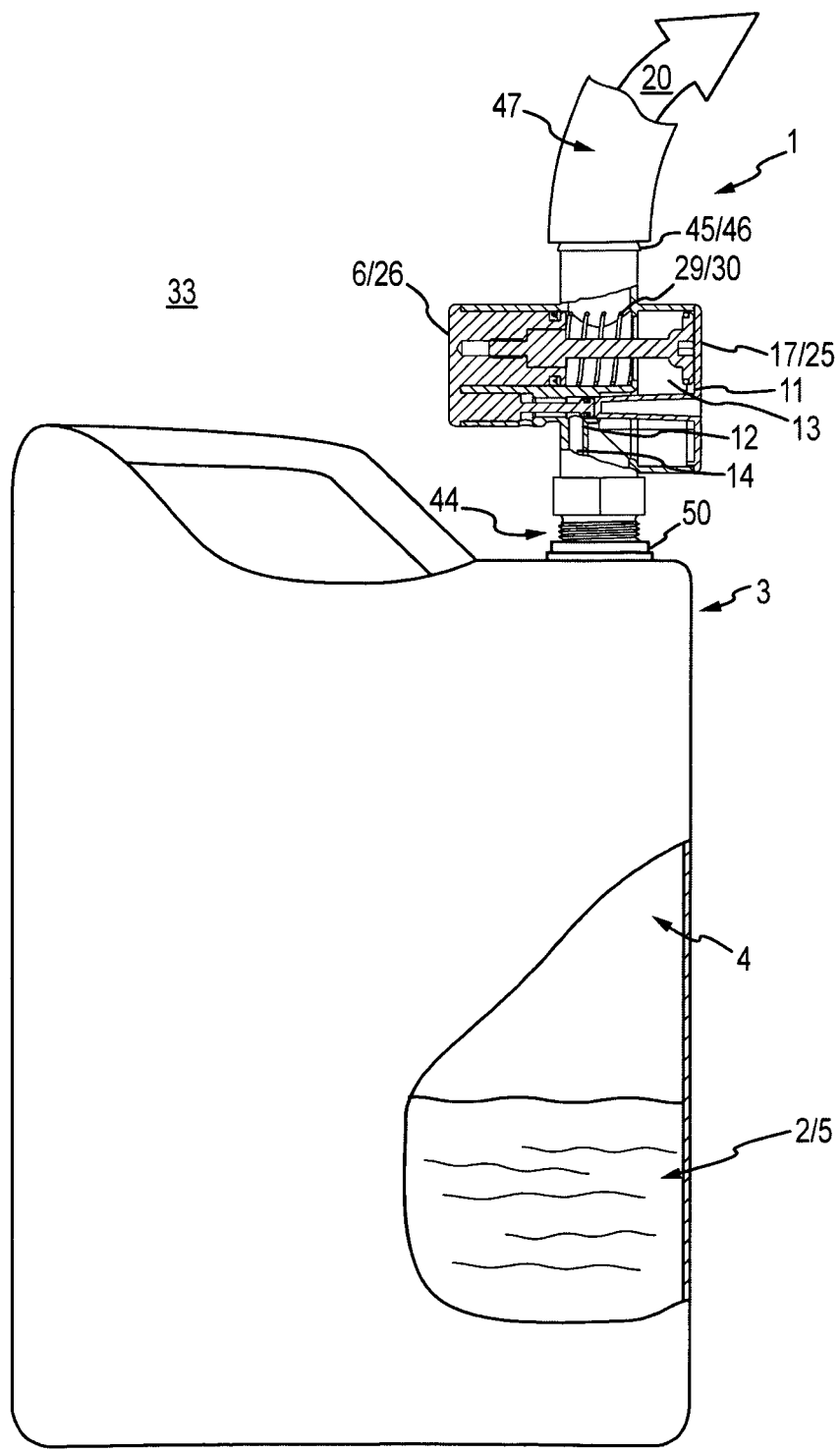
FIG. 1 shows a cross section 4-4 of an embodiment of an inventive valve coupled to a fluid source.

Now referring primarily to FIG. 1, a method of using an embodiment of the inventive valve (1) can include the step of providing an amount of fluid (2) located in a fluid source (3). The term "fluid source (3)" for the purpose of this invention means a vessel configured to couple to the inventive valve (1), or to which the inventive valve (1) can be configured to couple, or which can be adapted to couple to the inventive valve (1), to provide an enclosed space (4) in which an amount of fluid (2) can be located. The term "an amount of fluid" for the purposes of this invention means an amount of gas, whether a mixture of gases such as air, or other mixture of partial pressures of gases, or an amount of a single gas or substantially a single gas such as nitrogen, oxygen, argon, or the like, or an amount of liquid such as an amount of water, an amount of a solution which provides an amount of solute in an amount of solvent, an amount of fuel such as gasoline, diesel fuel, bio-diesel, or the like, an amount of alcohol such as methanol, ethanol, or isopropanol, or the like, and can further encompass an amount of liquid which entrains an amount of biological particles whether or not soluble in such liquid such as nucleic acids, proteins, cells, or the like, or an amount of non-biological particles whether soluble or not such as an element, a molecule whether organic or inorganic, a salt, beads, or the like, or mixtures, combinations or permutations thereof.

For the purposes of the present invention, the term "a" or "an" entity refers to one or more of that entity; for example, "a valve" refers to one or more valves(s) or at least one valve. As such, the terms "a" or "an", "one or more" and "at least one" can be used interchangeably herein. Furthermore, the term "selected from the group consisting of" refers to one or more of the related elements in the list that follows, including combinations of two or more of the listed elements.

Ranges may be expressed herein as from "about" one particular value to "about" another particular value. When such a range is expressed, one embodiment of the invention includes from approximately the one particular value to approximately the other particular value and another embodiment includes from the one particular value to the other particular value. It will be further understood that the endpoints of each of the ranges are significant both in relation to the other endpoint, and independent of the other endpoint. Similarly, when a value is expressed as an approximation by use of the antecedent "about," it will be understood that an embodiment of the invention includes approximately the particular value while the particular value forms another embodiment of the invention.

Figure 9:
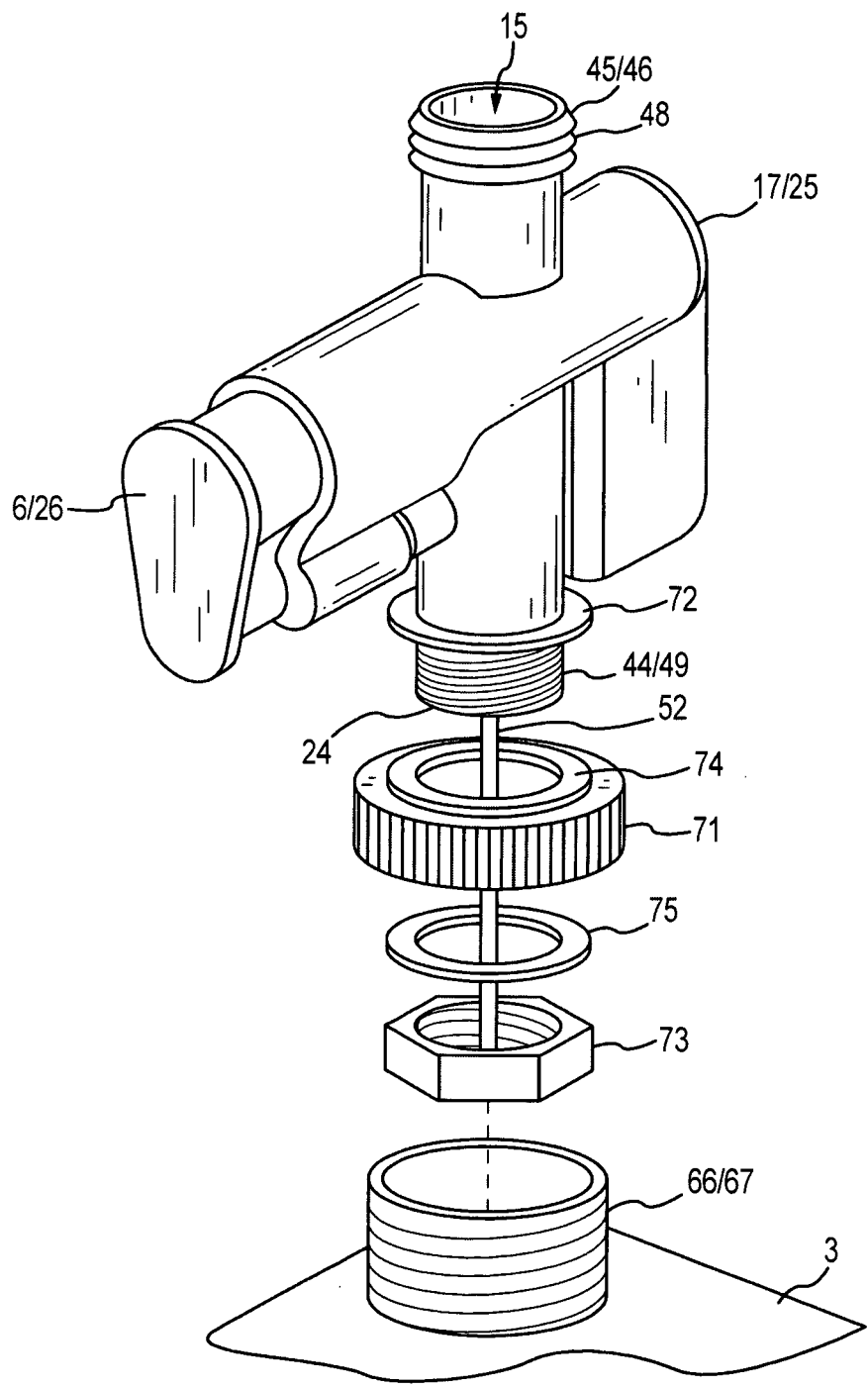
FIG. 9 shows an exploded view of a particular embodiment of the inventive valve coupled to a cap which matably engages a fluid source outlet of a fluid source.

The inventive method can further include the step of coupling the inventive valve (1) to the fluid source (3) to generate the enclosed space (4) which can contain an amount of fluid (2). Coupling of the inventive valve (1) to the fluid source (3) can be achieved by engaging matable surfaces provided by a part of the fluid source (3) and a part of the valve (1). FIGS. 1 and 9 provide non-limiting examples of the inventive valve (1) coupled to the fluid source (3). The amount of fluid (2) when provided as an amount of liquid (5), as shown in FIG. 1, can be any amount of liquid (5) of lesser amount than the volume defined by the enclosed space (4) of the fluid source (3).

Figure 2:
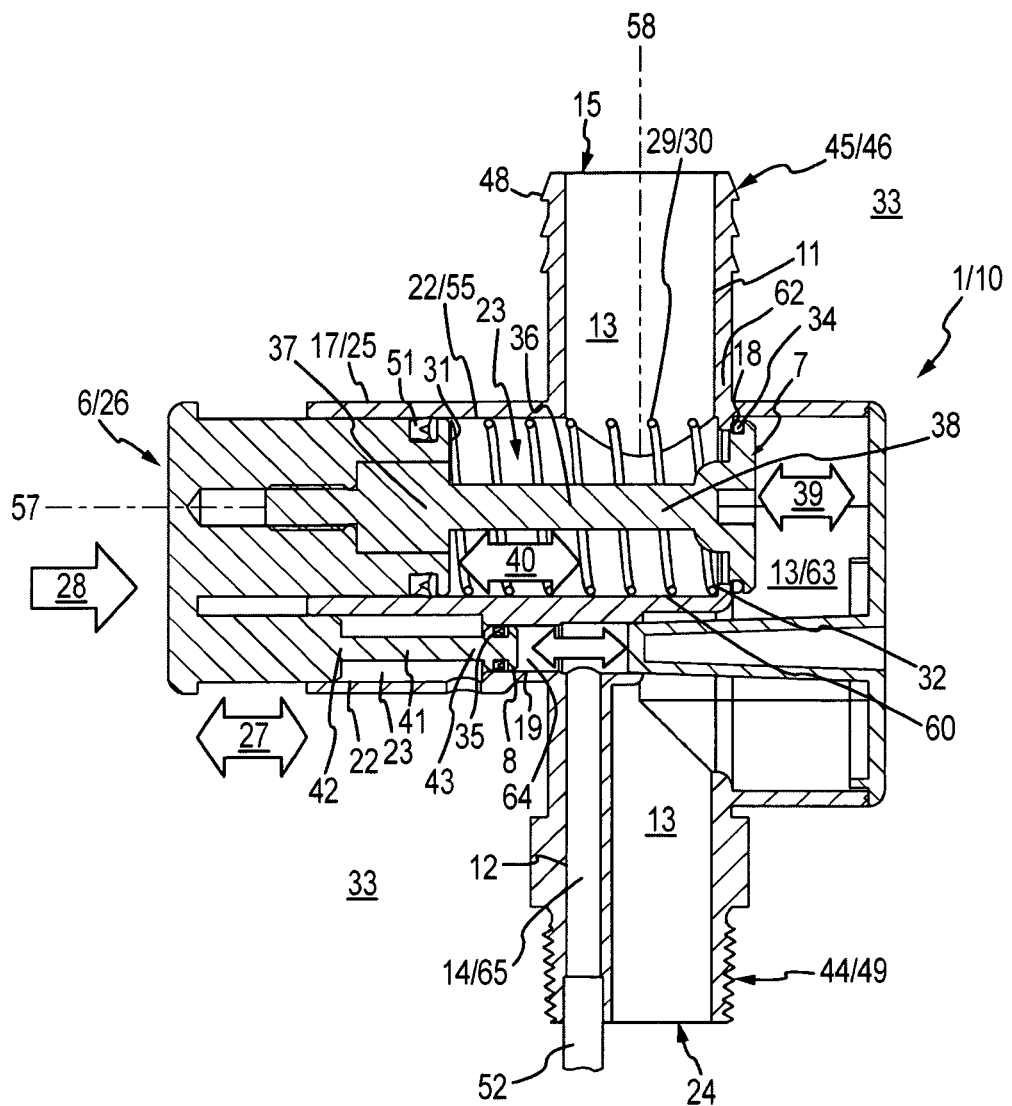
FIG. 2 shows a cross section 4-4 of an embodiment of the inventive valve in the closed condition.
Figure 3:
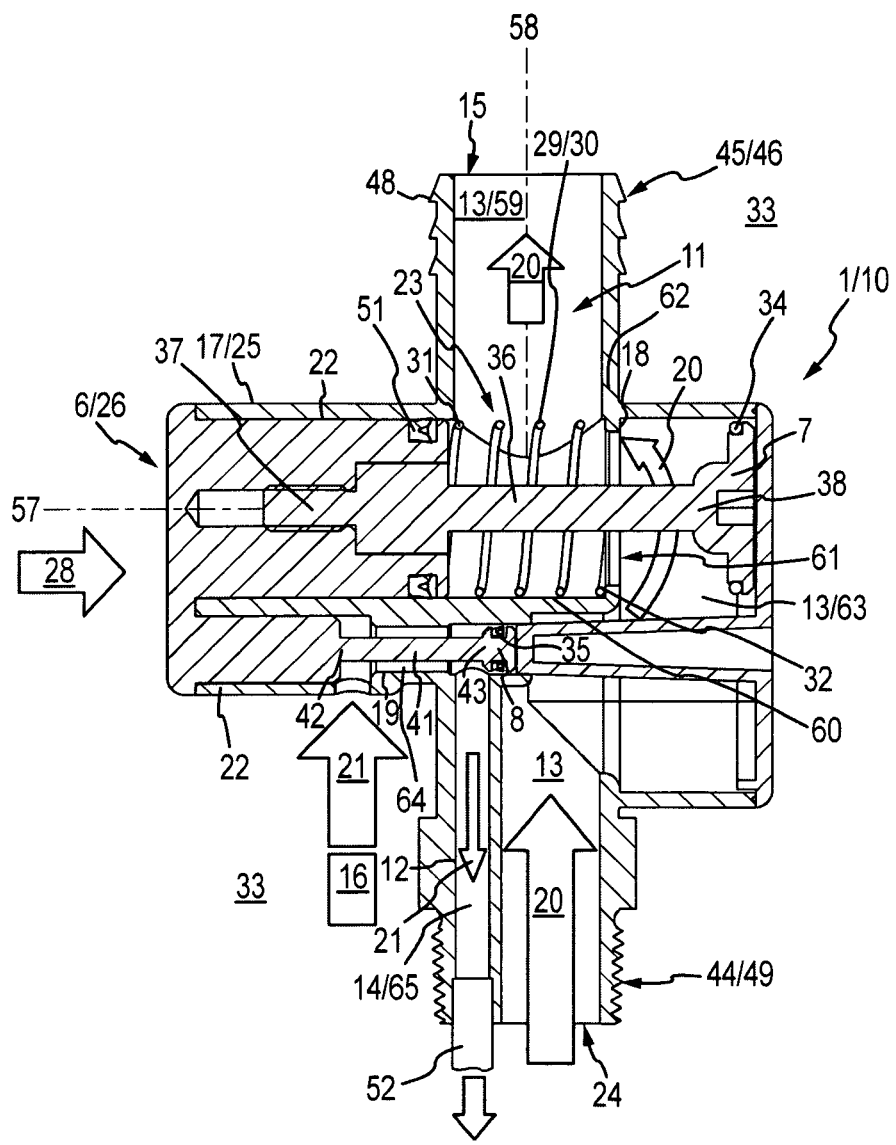
FIG. 3 shows a cross section 4-4 of an embodiment of the inventive valve in the open condition.

Now referring primarily to FIGS. 2 and 3, the inventive method can further include the step of operating a valve trigger (6). Operating a valve trigger (6), for the purposes of the invention means generating travel of a valve trigger (6) slidely or telescopically engaged in a valve trigger guide (22) of a valve housing (17). For the purposes of the present invention, "a valve trigger (6)" has a configuration capable of generating coincident operation (contemporaneous occurrence of events) of a fluid delivery passage seal (7) and a fluid compensation passage seal (8) in corresponding relation to a fluid delivery passage seat (18) and a fluid compensation passage seat (19) to provide the corresponding open condition (9) and closed condition (10) of a fluid delivery passage (11) and a fluid compensation passage (12)(see FIG. 2 which shows the closed condition (9) and FIG. 3 which shows the open condition (10)). By establishing the open condition (9) of the fluid delivery passage (11) and the open condition (10) of the fluid compensation passage (12) (also referred to as the open condition (10) and the closed condition (11) of the valve (1)) coincident fluidic coupling of the fluid delivery passage (11) and the fluid compensation passage (12) can be established with the fluid source (3). The term "fluid delivery passage (11)" for the purposes of this invention means a passage having a configuration which provides a fluid delivery flow path (13) through which an amount of fluid (2) (whether a gas or a liquid) can flow (20)(as indicated by the arrow shown in FIG. 3 have reference numeral (20)) from a fluid source (3) to a valve outlet orifice (15) of a valve outlet (45). The term "fluid compensation passage (12)" for the purpose of this invention means a passage having a configuration which provides a fluid compensation flow path (14) through which an amount of compensation fluid (16)(whether a gas or a liquid) can provide a compensating flow (21) to the fluid source (3). The term "coincident fluidic coupling" for the purposes of this invention means the contemporaneous occurrence of events which establishes a fluid delivery passage (11) with a fluid source (3) and establishes a fluid compensation passage (12) with a fluid source (3); however, the duration of the event which establishes the fluid delivery passage (11) with the fluid source (3) and the duration of the event which establishes the fluid compensation passage (12) with the fluid source (3) can but need not share the entirety of the same period or phase, but rather the duration of the event which establishes the fluid delivery passage (12) with the fluid source (3) and the duration of the event which establishes the fluid compensation passage (12) need only share a part of the same period or phase or range.

Now referring primarily to FIG. 3, the inventive method can further include the steps of delivering a flow (20) of an amount of fluid (2) from the fluid source (3) through a fluid delivery passage (11) to exit from a valve outlet orifice (15)(or establishing a fluid delivery passage (11) between a valve inlet orifice (24) and a valve outlet orifice (15)) while coincidently generating a compensating flow (21) of an amount of compensation fluid (16) through the fluid compensation passage (12) into the enclosed space (4) of the fluid source (3)(or establishing a fluid compensation passage between a fluid compensation inlet orifice (53) and a fluid compensation outlet orifice (54)). The term "an amount of compensation fluid (16)" for the purposes of this invention means an amount of gas, whether a mixture of gases such as air, or other mixture of partial pressures of gases, or an amount of a single gas or substantially a single gas such as nitrogen, oxygen, argon, or the like, or an amount of liquid such as an amount of water, an amount of a solution which provides an amount of solute in an amount of solvent, an amount of fuel such as gasoline, diesel fuel, bio-diesel, or the like, an amount of alcohol such as methanol, ethanol, or isopropanol, or the like, and can further encompass an amount of liquid which entrains an amount of biological particles whether or not soluble in such liquid such as nucleic acids, proteins, cells, or the like, or an amount of non-biological particles whether soluble or not such as an element, a molecule whether organic or inorganic, a salt, or the like, or combinations and permutations thereof.

Now referring primarily to FIGS. 2 and 3, the inventive method can further include the step of providing a valve housing (17) which can have a variety of constructional forms that each define the fluid delivery passage (11) and the corresponding fluid delivery flow path (13) and define the configuration of the fluid compensation passage (12) and the corresponding fluid compensation flow path (14). The step of providing a valve housing (17) can further include the step of locating a fluid delivery passage seat (18) within the fluid delivery passage (11) and locating a fluid compensation passage seat (19) in the fluid compensation passage (12) which correspondingly engage the fluid delivery passage seal (7) and the fluid compensation passage seal (8) to coincidently interrupt the step of delivering a flow (20) and interrupt the step of compensating flow (21) in the closed condition (9) of the valve (1) and can correspondingly disengage from the fluid delivery passage seal (7) and the fluid compensation passage seal (8) to provide the steps of delivering a flow (20) and compensating a flow (21) in the open condition (10) of the valve (1).

The step of providing a valve housing (17) can further include the step of providing a trigger guide (22) configured to allow sliding or telescopic engagement of the valve trigger (6) to guide the valve trigger (6) along a valve trigger path (23) to generate coincident operation of the fluid delivery passage seal (7) and the fluid compensation passage seal (8) in relation to the corresponding fluid delivery passage seat (18) and fluid compensation passage seat (19) to provide the corresponding open condition (9) and closed condition (10) of the valve (1). As to certain embodiments of the inventive valve (1), the step of providing a trigger guide (22) can further comprise the step of providing a valve trigger stem guide (55) discrete from a valve trigger compensation stem guide (56). As to those embodiments, the step of operating a valve trigger (6) can further comprise operating a valve trigger (6) configured to include a valve trigger stem (36) having a first valve trigger stem end (38) coupled to the valve trigger (6) and a second valve trigger stem end (38) coupled to said fluid delivery passage seal (7) which slidly or telescopically engages the valve trigger stem guide (55) and a discrete valve trigger compensation stem (41) having a first valve trigger compensation stem end (42) coupled to said valve trigger (6) and a second valve trigger compensation stem end (43) coupled to the fluid compensation passage seal (8) which slidely or telescopically engages the valve trigger compensation stem guide (56).

Now referring primarily to FIGS. 4-8, the above-described method can be practiced with various embodiments of the inventive valve (1) each of which provides a valve housing (17) and a valve trigger (6). While the valve housing (17) and valve trigger (6) shown by FIGS. 4-8 provides particular example of a valve housing external surface configuration (25) and a particular example of a valve trigger external surface configuration (26), the invention is not so limited, and the valve housing (17) and the valve trigger (6) can afford a numerous and wide variety of external surface configurations which are capable of functioning in accordance with the above-described method.

Accordingly, and referring primarily to FIGS. 2 and 3, embodiments of the valve housing (17) have an internal surface configuration which in part provides a valve trigger guide (22) which defines a valve trigger path (23). A part of the external surface of the valve trigger (6) slidingly (also referred to as telescopically) engages the valve trigger guide (22) to allow travel (27)(shown by arrow in FIG. 3 having reference numeral (40)) of the valve trigger (6) along the valve trigger path (23). As shown in FIGS. 2 and 3, a part of the valve trigger (6) can extend beyond the boundary of the external surface of the valve housing (17) for engagement by a valve operator (28)(shown as the arrow having the reference numeral (28)). The valve operator (28) can be any person or mechanical device capable of operating the valve trigger (6), to function as above described. The valve operator (28) by engaging that part of the valve trigger (6) which extends beyond the valve housing (17) can by forcible urging generate inward travel (27)(shown In FIG. 3 as the arrow having the reference numeral (27)) of the valve trigger (6) along the valve trigger path (23). The valve trigger (6) can further provide a first valve trigger stop (28) which upon travel of the valve trigger (6) a distance along the valve trigger path (23) can engage a part of the external surface of the valve housing (17) to prevent further inward travel (27) of the valve trigger (6) along the valve trigger path (23). Forcible urging by the valve operator (28) of the valve trigger (6) inwardly along the valve trigger path (23) can be opposed by a valve trigger bias element (29).

The valve trigger bias element (29) shown in FIGS. 2 and 3 has the constructional form of a coil spring (30) having a first coil spring end (31) which engages the valve trigger (6) and a second coil spring end (32) which engages a part of the internal surface of the valve housing (17); however, the invention is not so limited, and the valve trigger bias element (29) can be of any constructional form which sufficiently opposes inward travel (27) of the valve trigger (6) along the valve trigger path (23) to generate travel (27) outwardly along the valve travel path (23) of the valve trigger (6) when disengaged by the valve operator (28). The valve trigger (6) can further include a trigger seal (51). The trigger seal (51) engages the valve trigger (6) and slidly sealably engages the valve trigger guide (22) to prevent transfer or reduce transfer of any part of the flow (20) of an amount of fluid (2)(or liquid (5)) in the fluid delivery passage (11) between the engaged surfaces of the valve trigger (6) and the valve trigger guide (22). A trigger seal (51) which can be utilized with the inventive valve (1) is a C-cup O-ring; however, the invention is not so limited, and any manner of seal which can slidly sealably engage the valve trigger guide (22) to prevent transfer or reduce transfer of any part of the flow (20) of an amount of fluid (2)(or liquid (5)) between the engaged surfaces of the valve trigger (6) and the valve trigger guide (22), can be utilized.

Again referring primarily to FIGS. 2 and 3, the internal surface configuration of the valve housing (17) can further define the configuration of fluid delivery passage (11) and the fluid delivery flow path (13) and the fluid compensation passage (12) and the fluid compensation flow path (14). The fluid delivery passage (11) and the fluid compensation delivery passage (12) in the open condition (9) of the valve (1) afford discrete passages each of which fluidly couple the enclosed space (4) in the fluid source (3) to the space outside of the fluid source (3). In the example shown, the space outside of the fluid source (3) comprises the atmosphere (33).

The internal surface configuration of the valve housing (17) can further define the configuration of a fluid delivery passage seat (18) coupled within the fluid delivery passage (11). A fluid delivery passage seal (7) has a configuration which can sealably engage the fluid delivery seat (18) coupled to the fluid delivery passage. Sealable engagement of the fluid delivery passage seal (7) to the fluid delivery passage seat (18) establishes the closed condition (10) of the fluid delivery passage (11) and the valve (1), as shown in FIG. 2. Disengagement of the fluid delivery seal (7) from the fluid delivery passage seat (18) establishes the open condition (9) of the fluid delivery passage (11) and the valve (1) fluidly coupling the enclosed space to atmosphere (33). The fluid delivery passage seal (7) can further include a resiliently flexible seal element (34) which assists in establishing the seal with the between the fluid delivery passage seal (7) and the fluid delivery passage seat (18).

The internal surface configuration of the valve housing (17) can further define the configuration of a fluid compensation passage seat (19) coupled within the fluid compensation passage (12). A fluid compensation passage seal (8) has a configuration which can sealably engage the fluid compensation passage seat (18) coupled to or a part of the fluid compensation passage (12). Sealable engagement of the fluid compensation passage seal (8) to the fluid compensation passage seat (19) establishes the closed condition (10) of the fluid delivery passage (11) as shown in FIG. 2. Disengagement of the fluid compensation passage seal (8) from the fluid compensation passage seat (18) establishes the open condition (9) of the fluid delivery passage (11) fluidicly coupling the enclosed space (4) to atmosphere (33). The fluid compensation passage seal (8) can further include a resiliently flexible compensation seal element (35)(such as a C-cup O-ring) which assists in establishing the seal with the between the fluid compensation passage seal (8) and the fluid compensation passage seat (19). As shown by FIGS. 2 and 3, a non-limiting embodiment of the fluid compensation seat (19) can comprise a part of the wall of the fluid compensation passage (12).

Now referring primarily to FIGS. 2 and 3, the fluid delivery passage seal (7) can be made responsive to travel (27) of the valve trigger (6) in the valve trigger guide (22). A non-limiting embodiment of the inventive valve (1), includes a valve trigger stem (36) having a first valve trigger stem end (37) coupled to the valve trigger (6) and a second valve trigger stem end (38) coupled to the fluid deliver passage seal (7). Inward travel of the valve trigger (6) in the valve trigger guide (22) as above-described correspondingly generates a sufficient amount of travel (39) in the fluid delivery passage seal (7) to disengage the fluid delivery passage seal (7) from the fluid deliver passage seat (18) to establish the open condition (9) of the fluid delivery passage (11) to fluidly couple the enclosed space (4) with the atmosphere (33). Outward travel of the valve trigger (6) in the valve trigger guide (22) as above-described correspondingly generates a sufficient amount of travel (39) in the fluid delivery passage seal (7) to engage the fluid delivery passage seal (7) to the fluid deliver passage seat (18) to establish the closed condition (10) of the fluid delivery passage (11) to fluidly uncouple the enclosed space (4) from the atmosphere (33). Travel of the valve trigger (6) from a first position which establishes the closed condition (10) of the fluid delivery passage (11) toward a second position which establishes the open condition (9) of the fluid delivery passage (11) allows a variably adjustable delivery of the flow (20) through the fluid delivery flow path (13).

In the particular embodiment of the valve (1) shown in FIGS. 2 and 3, the valve trigger housing (17) defines a configuration which disposes a longitudinal axis (57) of the valve trigger stem guide (55) in substantially perpendicular relation to a longitudinal axis (58) of a first part (59) of the fluid delivery passage (11). Accordingly, the valve trigger stem (36) having first valve trigger stem end (37) coupled to the valve trigger (6) can be disposed in perpendicular relation within a first part (59) of the fluid delivery passage (11). The first part (59) of the fluid delivery passage (11) can terminate in a closed end (60) with the fluid delivery passage seat (18) providing an aperture (61) which communicates between opposed surfaces of a fluid delivery passage wall (62) of the fluid delivery passage (11). The valve trigger stem (36) extends through the aperture (61) of the fluid delivery passage seat (18). The valve delivery passage seal (7) couples to the second end (43) of the valve trigger stem (36) extending through the aperture (61) of the fluid delivery passage valve seat (18). Engagement of the fluid delivery passage seal (7) with the fluid delivery passage valve seat (18) generates a closed end (60) fluid delivery passage (11). Disengagement of the fluid delivery passage seal (7) from the fluid delivery passage seat (18) provides fluid communication through the aperture (61) of the fluid delivery passage seat (18) between opposed sides of the fluid delivery passage wall (62). The valve housing (17) further defines a second part (63) of the fluid delivery passage (11) disposed adjacent the first part (59) providing sufficient space for travel of the fluid delivery passage seal (7) and provides fluidic communication between the first part (59) of the fluid delivery passage (11) and the valve inlet orifice (24).

Again referring primarily to FIGS. 2 and 3, the fluid compensation passage seal (8) can also be made responsive to travel (40) of the valve trigger (6) in the valve trigger guide (22). A valve trigger compensation stem (41) has a first valve trigger compensation stem end (42) coupled to the valve trigger (6) and a second valve trigger compensation stem end (43) coupled to the fluid compensation passage seal (8). Inward travel of the valve trigger (6) in the valve trigger guide (22) as above-described correspondingly generates a sufficient amount of travel (40) in the fluid compensation passage seal (8) to disengage the fluid compensation passage seal (8) from the fluid compensation passage seat (18) to establish the open condition (9) of the fluid compensation passage (12) to fluidly couple the enclosed space (4) with the atmosphere (33). Outward travel of the valve trigger (6) in the valve trigger guide (22) as above-described correspondingly generates a sufficient amount of travel (40) in the fluid compensation passage seal (8) to engage the fluid compensation passage seal (8) to the fluid compensation passage seat (19) to establish the closed condition (10) of the fluid compensation passage (12) to fluidly uncouple the enclosed space (4) from the atmosphere (33).

In the non-limiting embodiment of the valve (1) shown in FIGS. 2 and 3, the valve housing (17) further defines a valve trigger compensation stem guide (56) discrete from the valve trigger stem guide (55), above described. The first valve trigger compensation stem end (42) of the valve trigger compensation stem (41) couples to the trigger (6) and slidely or telescopically engages the valve trigger compensation stem guide (56). The second valve trigger compensation stem end (43) of the valve trigger compensation stem (41) couples to the fluid compensation passage seal (8). The fluid compensation passage seal (8) shown has a cylindrical configuration which slidely engages a cylindrical fluid compensation passage seat (19). The cylindrical fluid compensation passage seat (19) also comprises a first portion (64) of the fluid compensation passage (12). Slidable engagement of the fluid compensation passage seal (8) with the compensation passage seat (19) also a first portion (64) of the fluid compensation passage (12) establishes the closed condition (10) of the fluid compensation passage (12)(shown in FIG. 2). A second portion (65) of the fluid compensation passage (12) communicates in perpendicular relation to the first portion (64) of the fluid compensation passage (12). This constructional form allows the fluid compensation seal (8) to travel outside of the fluid compensation passage seat (19)(also a first portion (64) of the fluid compensation passage (12)) establishing the open condition (9) of the fluid compensation passage (12) with the amount of compensation fluid (16) flowing about the valve trigger compensation stem (41) to establish a compensating flow (21) to the second portion (65) of the fluid compensation passage (12).

While each of the valve trigger stem (36) and the valve trigger compensation stem (41) shown in the Figures provide a generally cylindrical member coupled between the valve trigger (6) and the corresponding fluid deliver passage seal (8) and fluid compensation passage seal (8); the invention is not so limited and the valve trigger stem (36) and the valve trigger compensation stem (41) can be configured in any manner which allows each seal to travel (39)(40) responsive to the valve trigger (6) and establishes each seal (7)(8) at a location within the valve housing (17) which allows each to sealably engage and disengage the corresponding seat (18)(19) to establish the corresponding open condition (9) or closed condition (10) of each passage (11)(12) in response to travel (39) of the valve trigger (6) in the valve trigger guide (22).

Now referring primarily to FIGS. 2 and 3, the inventive valve (1) can further include a fluid compensation passage extension element (52). The fluid compensation passage extension element (52) can be a discrete element or unitary with the fluid compensation passage (12). As shown in FIGS. 2 and 3, a non-limiting embodiment of the fluid compensation passage extension element (52) can comprise a tube having sufficient length to extend to the bottom of the fluid source (3).

Figure 7:
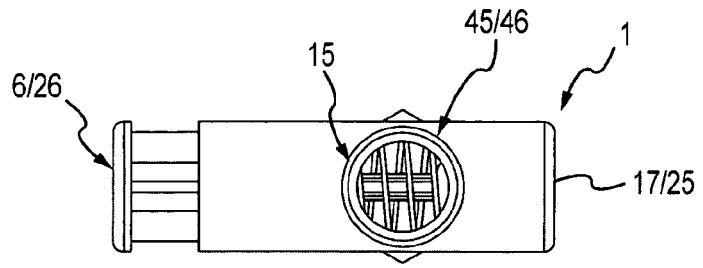
FIG. 7 shows top view of an embodiment of the inventive valve.
Figure 8:
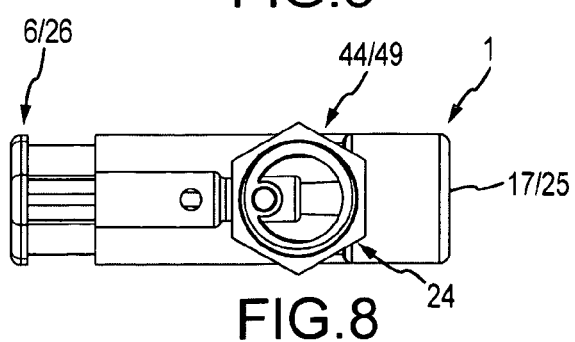
FIG. 8 shows a bottom view of an embodiment of the inventive valve.

Now referring generally to FIGS. 1-6 and specifically to FIGS. 7 and 8, the inventive valve (1) can further provide a valve inlet (44) and a valve outlet (45). The valve outlet (45) can provide a valve outlet external surface (46) configured to mate with a conduit (47)(see FIG. 1). As shown in the a non-limiting example FIGS. 4-6, the valve outlet external surface (46) can further provide one or a plurality of hose barbs (48). A length of tubular conduit (47) or hose having an internal diameter of about the outside diameter of the valve outlet (45) and having a sufficiently flexible wall can be slidely engaged with the hose barbs (48) to connect the conduit (47) to the valve outlet (45). However, the inventive valve (1) is not so limited and the valve outlet external surface (46) or the valve outlet (45) can be configured in any manner which can be coupled with a conduit (47)(for the purposes herein "a conduit" is a member which provides a passage through which a fluid can flow such as a hose or a tube) by the provision of matable fitting such as providing spiral threads, compressibly mated fittings, insertably mated sockets, or the like.

Figure 4:
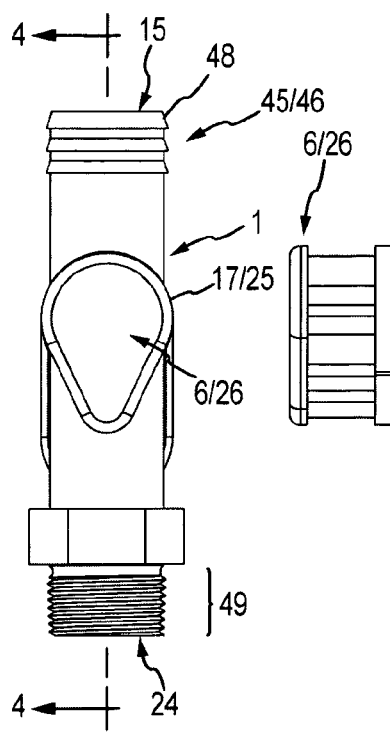
FIG. 4 shows an end view of an embodiment of the inventive valve indicating cross section 4-4.
Figure 5:
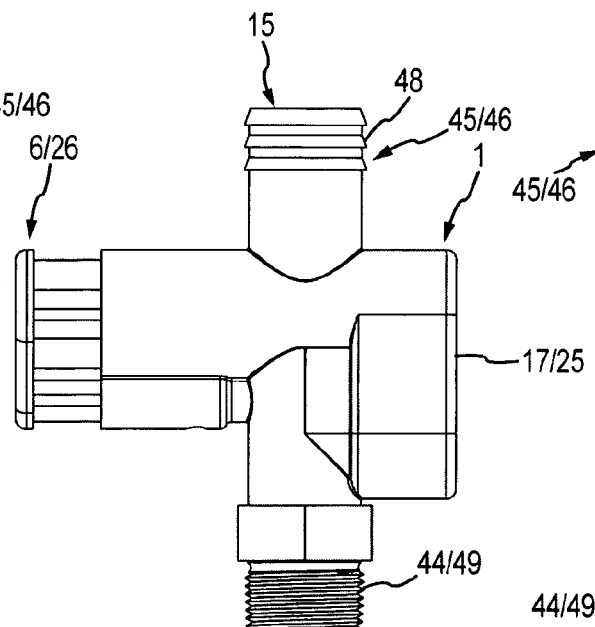
FIG. 5 shows a side view of an embodiment of the inventive valve.
Figure 6:
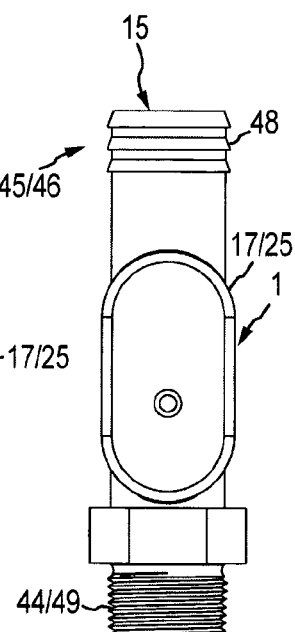
FIG. 6 shows an end view of an embodiment of the inventive valve.

Similarly, the valve inlet (44) can provide a valve inlet external surface (49) configured to mate with the fluid source (3). As shown in FIGS. 2-4, a particular embodiment of the inventive valve (1) can provide a spirally threaded valve inlet external surface (49) configured to mate with a spiral thread of a fluid source outlet (50). However, the inventive valve (1) is not so limited and the valve inlet external surface (49) or the valve inlet (44) can be configured in any manner which can be coupled with the fluid source outlet (50) by the provision of matable fitting such as providing spiral threads, compressibly mated fittings, insertably mated sockets, or the like.

Now referring primarily to FIG. 9, embodiments of the inventive valve (1) can provide a valve housing (17) configured to couple to fluid source outlet (50) of a fluid source (3). Coupling of the inventive valve (I) to the fluid source (3) can be achieved by engaging matable surfaces provided by a part of the fluid source (3) and a part of the valve (1). In FIG. 1, as one non-limiting example, the valve housing (17) was configured to provide a spirally threaded valve inlet external surface (49) configured to mate with a spiral thread of a fluid source outlet (50). In FIG. 9, as a second non-limiting example, the fluid source outlet (50) can be configured as an outwardly extending tubular member (66) having a spirally threaded tubular member external surface (67) which rotatingly receives a cap (68) having a spirally threaded cap internal surface (69)(or other matable surfaces). A cap aperture (70) can perforate the cap top (71). The cap aperture (70) can be sufficiently large to allow the spirally threaded portion of valve inlet (44) to pass through. An annular projection element (72) can coupled about the valve housing (17) at a location adjacent the spirally threaded (or other matable surface) of the valve inlet (44). A part of the external surface of the annular projection element (72) and the external surface of the cap (68) can engage to dispose the valve housing (17) in mated relation to the cap (68). The portion of spirally threaded valve inlet (44) extending through the cap aperture (70) can rotatingly receive a correspondingly spirally threaded fastener (73) which operationally draws the external surface of the annular projection element (72) adjacent a corresponding portion of the external surface of the cap ( ). As to certain embodiments of the invention, the external surfaces of the cap (68) and the annular projection element (72) can be sufficiently compressed by operation of the spirally threaded fastener (73) to sealably engage. As to other embodiments of the invention, a first seal member (74) can be located between the external surfaces of the annular projection element (72) and the cap (68) and a second seal member (75) can be located between the external surfaces of the cap (68) and the spirally threaded fastener (73). The cap (68) coupled to the valve (1) can be rotatingly engaged to the fluid source outlet (50). Understandably, these specific examples of coupling the inventive valve (1) to a fluid source (3) are intended to provide sufficient description for a person of ordinary skill in the art to couple the inventive valve (1) to a numerous and wide variety of fluid sources (3) which may have a wide variety of configurations of fluid source outlets (50).

As can be easily understood from the foregoing, the basic concepts of the present invention may be embodied in a variety of ways. The invention involves numerous and varied embodiments of an inventive valve system and methods of using such embodiments of the inventive valve system.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "trigger" should be understood to encompass disclosure of the act of "triggering"—whether explicitly discussed or not—and, conversely, were there effectively disclosure of the act of "triggering", such a disclosure should be understood to encompass disclosure of a "trigger" and even a "means for triggering." Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

Thus, the applicant(s) should be understood to claim at least: i) each of the valves herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

The claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. A valve, comprising:
   a) a valve housing having an internal surface defining:
      i) a fluid delivery passage between an axially aligned valve inlet orifice and valve outlet orifice, said fluid delivery passage configured to flow an amount of fluid from an enclosed space of a fluid source, wherein said fluid delivery passage has a first part which terminates in a closed end;
      ii) a fluid delivery passage seat defining an aperture which communicates between opposed surfaces of a fluid delivery passage wall of said first part of said fluid delivery passage;
      iii) a second part of said fluid delivery passage disposed in substantially orthogonal adjacent relation to said fluid delivery passage wall of said first part, said second part having sufficient internal space to enclose and provide travel of a fluid delivery passage seal between a closed condition and an open condition of said valve, said second part of said fluid delivery passage providing orthogonal fluidic communication in said open condition of said fluid delivery passage seal between said first part of said fluid delivery passage and said valve inlet orifice;
      iv) a fluid compensation passage between a fluid compensation inlet orifice and a fluid compensation outlet orifice, said fluid compensation passage configured to flow an amount of compensation fluid to said enclosed space within said fluid source, said fluid compensation passage discrete from said fluid delivery passage;
      v) a fluid compensation passage seat coupled within said fluid compensation passage; and
      vi) a valve trigger guide having a longitudinal axis disposed in substantially orthogonal relation to a longitudinal axis of said first part of said fluid delivery passage and coaxial with said aperture; and
   b) a valve trigger telescopically engaged in said trigger guide, said valve trigger having a valve trigger stem which extends through said aperture of said fluid delivery passage seat which allows concurrent engagement of said fluid delivery passage seal with said fluid delivery passage seat and engagement of a fluid compensation passage seal with said fluid compensation passage seat to coincidentally establish a closed condition of said fluid delivery passage and a closed condition of said fluid compensation passage.

2. The valve of claim 1, wherein said valve trigger guide comprises a configuration which includes:
   i) a valve trigger stem guide; and
   ii) a valve trigger compensation stem guide discrete from said valve trigger stem guide, and wherein said
   valve trigger stem has a first end coupled to said valve trigger and a second end coupled to said fluid delivery passage seal, said valve trigger stem telescopically engaged in said valve trigger stem guide, and wherein
   a valve trigger compensation stem has a first end coupled to said valve trigger and a second end coupled to said fluid compensation passage seal, said valve trigger compensation stem telescopically engaged in said valve trigger compensation stem guide.

3. The valve of claim 2, further comprising a valve trigger bias element coupled to said valve trigger which urges said fluid delivery passage seal against said fluid delivery passage seat and said fluid compensation passage seal against said fluid compensation passage seat.

4. The valve of claim 3, wherein said valve trigger bias element comprises a coil spring having first coil spring end which engages a part of said valve trigger and a second coil spring end which engages a part of said internal surface of said valve housing.

5. The valve of claim 4, further comprising a first resiliently flexible seal element coupled to said fluid delivery passage seal configured to sealably engage said fluid delivery passage seat and further comprising a second resiliently flexible seal element coupled to said fluid compensation passage seal configured to sealably engage said fluid compensation passage seat.

6. The valve of claim 5, further comprising:
   a) a fluid source outlet; and
   b) a valve inlet having a configuration which couples to said fluid source outlet.

7. The valve of claim 6, further comprising a fluid compensation extension element coupled to said fluid compensation passage to extend said fluid compensation passage a distance within said enclosed space within said fluid source.

8. The valve of claim 7, wherein said open condition of said valve concurrently fluidly couples said fluid delivery passage and said fluid compensation passage with said enclosed space within said fluid source.

9. The valve of claim 8, further comprising an amount of fluid which flows from said enclosed space through said fluid delivery passage and an amount of compensation fluid which flows from atmosphere through said fluid compensation passage into said enclosed space.

10. The valve of claim 9, further comprising a valve inlet configured to couple to said fluid source outlet comprises a cap, wherein said cap has a cap aperture through which said valve inlet extends, and wherein said valve inlet further comprises:
   a) a collar extending a distance radially outward from said valve inlet, wherein said valve inlet passes through said cap aperture to engage said collar with said cap, and
   b) a fastener which engages said valve inlet passed through said cap aperture to fix engagement of said collar with said cap.

11. A method of providing a valve, comprising the steps of:
   a) establishing a fluid delivery passage between an axially aligned valve inlet orifice and valve outlet orifice, said fluid delivery passage configured to flow an amount of fluid from an enclosed space of a fluid source coupled to said valve, wherein said fluid delivery passage has a first part which terminates in a closed end;
   b) locating a fluid delivery passage seat defining an aperture which communicates between opposed surfaces of a fluid delivery passage wall of said first part of said fluid delivery passage;
   c) disposing a second part of said fluid delivery passage in substantially orthogonal adjacent relation to said fluid delivery passage wall, said second part having sufficient internal space to enclose and provide travel of a fluid delivery passage seal between a closed condition an open condition, said second part of said fluid delivery passage providing orthogonal fluidic communication in said open condition of said fluid delivery passage seal between said first part of said fluid delivery passage and said valve inlet orifice;
   d) establishing a fluid compensation passage between a fluid compensation inlet orifice and fluid compensation outlet orifice, said fluid compensation passage configured to flow an amount of compensation fluid to within said enclosed space of said fluid source, said fluid compensation passage discrete from said fluid delivery passage;
   e) locating a fluid compensation passage seat within said fluid compensation passage;
   f) providing a valve trigger guide configured to telescopically receive a valve trigger, said valve trigger guide having a longitudinal axis disposed in substantially orthogonal relation to a longitudinal axis of said first part of said fluid delivery passage and coaxial with said aperture;
   g) telescopically engaging said valve trigger in said valve trigger guide, said valve trigger having a valve trigger stem which extends through said aperture of said fluid delivery passage seat to locate said fluid delivery passage seal to releasably engage said fluid delivery passage seat upon telescopic travel of said valve trigger in said trigger guide;
   h) locating a fluid compensation passage seal in said fluid compensation passage which upon telescopic travel of said valve trigger in said trigger guide releasably seals with said fluid compensation passage seat; and
   i) configuring said valve trigger to generate concurrent releasable seal of said fluid delivery passage seal with said fluid delivery seat and said fluid compensation passage seal with said fluid compensation passage seat.

12. The method of providing a valve of claim 11, further comprising the step of configuring said valve trigger guide to further include:
   i) a valve trigger stem guide; and
   ii) a valve trigger compensation stem guide discrete from said valve trigger stem guide.

13. The method of providing a valve of claim 12, wherein said
   valve trigger has a first end coupled to said valve trigger and a second end coupled to said fluid delivery passage seal, said valve trigger stem telescopically engaged in said valve trigger stem guide, and wherein
   a valve trigger compensation stem having a first end coupled to said trigger and a second end coupled to said fluid compensation seal, said valve trigger compensation stem telescopically engaged in said valve trigger compensation stem guide.

14. The method of providing a valve of claim 13, further comprising the step of biasing said valve trigger to urge said fluid delivery passage seal against said fluid delivery passage seat and said fluid compensation passage seal against said fluid compensation passage seat.

15. The method of providing a valve of claim 14, further comprising the step of coupling a first resiliently flexible seal element to said fluid delivery passage seal configured to sealably engage said fluid delivery passage seat and coupling a second resiliently flexible seal element to said fluid compensation passage seal configured to sealably engage said fluid compensation passage seat.

16. The method of providing a valve of claim 15, further comprising the steps of:
   a) providing a fluid source outlet;
   b) configuring a valve inlet to couple to said fluid source outlet; and
   c) coupling said valve inlet to said fluid source outlet.

17. The method of providing a valve of claim 16, further comprising the steps of:
   a) providing a cap having a cap top having a cap aperture said cap configured to couple to said fluid source outlet;
   b) coupling a collar to said valve inlet which extends a distance radially outward from said valve inlet;
   c) passing said valve inlet through said cap aperture;
   d) engaging said collar to said cap top; and
   e) coupling a fastener to the external surface of said valve inlet passed through said cap aperture to fix engagement of said collar with said cap.

18. The method of providing a valve of claim 17, further comprising the step of coupling a fluid compensation extension element to said fluid compensation passage to extend said fluid compensation passage a distance within said enclosed space of said fluid source.

19. A method of using a valve, comprising the steps of
   a) generating travel of a valve trigger within a valve trigger guide of a valve housing having an internal surface defining:
      i) a fluid delivery passage between an axially aligned valve inlet orifice and valve outlet orifice configured to flow an amount of fluid from said enclosed space of said fluid source to said valve outlet, wherein said fluid delivery passage has a first part which terminates in a closed end and having a fluid delivery passage seat defining an aperture which communicates between opposed surfaces of a fluid delivery passage wall of said first part of said fluid delivery passage;
      ii) a second part of said fluid delivery passage disposed in substantially orthogonal adjacent relation to said fluid delivery passage wall, said second part having sufficient internal space to enclose and provide travel of a fluid delivery passage seal between a closed condition and an open condition of said valve, said second part of said fluid delivery passage providing orthogonal fluidic communication in said open condition of said fluid delivery passage seal between said first part of the fluid delivery passage and said valve inlet orifice;

iii) a fluid compensation passage between a fluid compensation inlet orifice and a fluid compensation outlet orifice, said fluid compensation passage configured to flow an amount of compensation fluid to said enclosed space in contact with said internal surface of said fluid source, said fluid compensation passage discrete from said fluid delivery passage; and iv) a fluid compensation passage seat coupled within said fluid compensation passage, said valve trigger guide having a longitudinal axis disposed in substantially orthogonal relation to a longitudinal axis of said first part of said fluid delivery passage and coaxial with said aperture, and wherein said valve trigger has a valve trigger stem which extends through said aperture of said fluid delivery passage seat which allows engagement of said fluid delivery passage seat and engagement of a fluid compensation passage seal with said fluid compensation passage seat to concurrently establish a closed condition of said fluid delivery passage and a closed condition of said fluid compensation passage;

b) disengaging a said fluid delivery passage seal from a fluid delivery passage seat located in a fluid delivery path of said valve concurrent with disengaging a said fluid compensation passage seal from a fluid compensation passage seat located in a fluid compensation passage of said valve in response to travel of said valve trigger in said valve trigger guide;

c) generating a flow of said amount of fluid contained in said enclosed space of said fluid source in a fluid delivery flow path of said fluid delivery passage between a valve inlet orifice and a valve outlet orifice concurrent with generating a flow of an amount of compensation fluid in said fluid compensation flow path of said fluid compensation passage between a fluid compensation passage inlet orifice located external to said enclosed space and a fluid compensation passage outlet orifice internal to said enclosed space;

d) compensating reduction in said amount of fluid contained in said enclosed space with an amount of compensation fluid in said enclosed space to reduce change of pressure within said enclosed space during flow of said amount of fluid through said fluid delivery passage.

20. The method of using a valve of claim 19, comprising the steps of:

a) generating travel of said valve trigger within said valve trigger guide of said valve said valve coupled to said fluid source having said enclosed space which contains said amount of fluid;

b) engaging said fluid delivery passage seal with a fluid delivery passage seat located in said fluid delivery path of said valve coincident with engaging said fluid compensation passage seal with said fluid compensation passage seat located in said fluid compensation passage of said valve in response to travel of said valve trigger in said valve trigger guide;

c) interrupting said flow of said amount of fluid contained in said enclosed space of said fluid source in said fluid delivery flow path of said fluid delivery passage between said valve inlet orifice and said valve outlet orifice concurrent with interrupting said flow of said amount of compensation fluid in said fluid compensation flow path of said fluid compensation passage between said fluid compensation passage inlet orifice located external to said enclosed space and said fluid compensation passage outlet orifice internal to said enclosed space;

d) maintaining compensated pressure within said enclosed space upon interruption of said flow of said amount of fluid through said fluid delivery passage.

\* \* \* \* \*